United States Patent [19]
Willems Van Dijk

[11] Patent Number: 5,684,657
[45] Date of Patent: Nov. 4, 1997

[54] LINEAR GUIDE ARRANGEMENT, DEVICE COMPRISING A LINEAR GUIDE ARRANGEMENT AND A HEAD FOR READING AND/OR WRITING INFORMATION FROM/ON A MEDIUM, AND INFORMATION REPRODUCING AND/OR RECORDING APPARATUS COMPRISING A LINEAR GUIDE ARRANGEMENT

[75] Inventor: Marcus J.H. Willems Van Dijk, Eindhoven, Netherlands

[73] Assignee: U.S. Philips Corporation, New York, N.Y.

[21] Appl. No.: 738,563

[22] Filed: Oct. 28, 1996

[30] Foreign Application Priority Data

Oct. 30, 1995 [EP] European Pat. Off. ............... 95202926

[51] Int. Cl.6 .................................................. G11B 5/584
[52] U.S. Cl. ........................................... 360/109; 360/106
[58] Field of Search .................................. 360/104–109, 360/128, 129, 137

[56] References Cited

U.S. PATENT DOCUMENTS

| | | | |
|---|---|---|---|
| 3,946,438 | 3/1976 | Altmann et al. ........................ | 360/88 |
| 4,642,717 | 2/1987 | Matsuda et al. ........................ | 360/105 |
| 4,684,794 | 8/1987 | Holland-Letz .......................... | 360/2 |
| 4,739,422 | 4/1988 | Kamei ..................................... | 360/106 |
| 4,757,409 | 7/1988 | Aruga et al. ............................ | 360/106 |
| 4,775,907 | 10/1988 | Shtipelman ............................. | 360/106 |
| 4,837,650 | 6/1989 | Kawada .................................. | 360/106 |
| 4,896,233 | 1/1990 | Yamada .................................. | 360/104 |
| 4,907,098 | 3/1990 | Ohkoda et al. ......................... | 360/2 |
| 5,029,030 | 7/1991 | Luecke .................................... | 360/106 |
| 5,039,849 | 8/1991 | Tano et al. .............................. | 235/475 |
| 5,235,170 | 8/1993 | Attillo .................................... | 235/475 |
| 5,599,268 | 2/1997 | Andersson et al. .................... | 493/184 |

FOREIGN PATENT DOCUMENTS 6-159359  6/1994  Japan.

OTHER PUBLICATIONS

"Rolamite: A New Mechanical Design Concept" by D.F. Wilkes, 1322, Dec. 1967.

Primary Examiner—Jefferson Evans
Attorney, Agent, or Firm—Michael E. Marion

[57] ABSTRACT

The linear guide arrangement comprises two bodies having respective guide surfaces. The guide surfaces face one another and are spaced from one another by two parallel rollers. The rollers are positioned by means of a number of steel bands secured to the bodies.

20 Claims, 5 Drawing Sheets

LINEAR GUIDE ARRANGEMENT, DEVICE COMPRISING A LINEAR GUIDE ARRANGEMENT AND A HEAD FOR READING AND/OR WRITING INFORMATION FROM/ON A MEDIUM, AND INFORMATION REPRODUCING AND/OR RECORDING APPARATUS COMPRISING A LINEAR GUIDE ARRANGEMENT

BACKGROUND OF THE INVENTION

1. Field of the Invention

Linear guide arrangement, device comprising a linear guide arrangement and a head for reading and/or writing information from/on a medium, and information reproducing and/or recording apparatus comprising a linear guide arrangement.

2. Discussion of the Related Arts

The invention relates to a linear guide arrangement comprising a first body having a first guide surface, a second body having a second guide surface, the second body facing the first guide surface with its second guide surface, a first roller and a second roller arranged parallel to the first roller, which rollers both bear on the first guide surface and the second guide surface, and a traction member engaging with the first roller at a side remote from the second roller and engaging with the second roller at a side remote from the first roller.

The invention also relates to a device comprising a linear guide arrangement and a head for reading and/or writing information from/on a medium.

The invention also relates to an apparatus for reading and/or writing information on a magnetic tape, comprising means for moving the magnetic tape past the head.

Such a linear guide is known from "Rolamite: a new mechanical concept" (page 67) published in 1967 by Sandia Laboratory, Albuquerque, N.M., USA under number SC-RR-67-656A. The known linear guide comprises a first body having two guide surfaces which are directed towards one another. A second body is interposed between these guide surfaces and has two guide surfaces which are remote from one another. The second body is guided relative to the first body by means of four rollers. A band is wrapped around two rollers at sides which are remote from one another, so that they are kept together by the band. The rollers have a first part of comparatively small diameter and a second part of comparatively large diameter. The known linear guide has the disadvantage that it requires four guide surfaces and four rollers. Moreover, the rollers must be provided with parts of different diameters. Besides, the known linear guide is very susceptible to production tolerances.

SUMMARY OF THE INVENTION

It is an object of the invention to provide a linear guide arrangement comprising few parts and having a low friction. To this end the linear guide arrangement in accordance with the invention is characterized in that at least one further traction member, which bears on at least one of the bodies, engages with the first roller at a side facing the second roller and engages with the second roller at a side facing the first roller. These measures result in a linear guide arrangement with two rollers and two guide surfaces. The rollers are spaced at a fixed distance from one another and the position of the two rollers unambiguously depends on the positions of the first and the second body relative to one another. Thus, the traction members always position the rollers so as to obtain an optimum bearing arrangement. Moreover, this positioning is effected in such a manner that substantially no friction occurs. This is achieved in that the surface portions of the traction members move along with the rollers when they are in contact with the rollers. In the case of, for example, a ball-bearing with a cage for positioning the rollers friction will occur between the balls and the cage.

An embodiment of the linear guide arrangement in accordance with the invention is characterized in that the first and the second roller bear on the first guide surface with a first curved surface and bear on the second guide surface with a second curved surface, and both curved surfaces of each roller have the same radius and are concentric. A special merit of this embodiment is that the two curved surfaces can be formed simply and accurately, yielding a low-cost accurate linear guide arrangement.

An embodiment of the linear guide arrangement in accordance with the invention is characterized in that the first roller and the second roller are constructed as circular cylinders. With this measure it is achieved that standard shafts can be used for the rollers. This minimizes the costs of the rollers and yet a roller is obtained having a surface which is circularly cylindrical in close approximation, so that the linear guide arrangement provides an accurate straight-line guidance.

An embodiment of the linear guide arrangement in accordance with the invention is characterized in that at least one of the traction members forms an endless loop. This measure reduces the number of points of attachment of a traction member to a body and simplifies alignment of the rollers, particularly if the relevant traction member is formed by a band.

An embodiment of the linear guide arrangement in accordance with the invention is characterized in that the traction members comprise a band. This embodiment has the advantage that the traction member in the form of a band has a comparatively high tensile strength with a comparatively small thickness of, for example, 10 micrometers. A small thickness of the traction member is important in order to preclude plastic deformation of the traction member in that it is bent over the roller. Such a plastic deformation would adversely affect the operation of the linear guide arrangement because such a deformation gives rise to loss of energy.

An embodiment of the linear guide arrangement in accordance with the invention is characterized in that at least one of the traction members has a local resistance to bending which varies over the length of the relevant traction member. This embodiment has the advantage that the linear guide arrangement can produce a force in its guiding direction. This is based on the principle that it requires less energy to bend a comparatively compliant portion of a traction member around a roller than a comparatively stiff portion of the traction member. This measure can be used, for example, to neutralize a preferential magnetic position of an electric motor or to neutralize the gravitational action on a part to be guided.

An embodiment of the linear guide arrangement in accordance with the invention is characterized in that the band has a width which varies over its length. As a result of this measure it is simple to obtain a local resistance to bending which varies over the length of the band. By the choice of a suitable width profile it is possible to realize a desired force-displacement diagram of the linear guide arrangement.

An embodiment of the linear guide arrangement in accordance with the invention is characterized in that the further traction members form part of a single traction element. This embodiment has the advantage that the number of parts and the number of points of attachment of a traction member to a body are reduced. This simplifies the construction of the linear guide arrangement, thus enabling it to be realized more cheaply. In order to obtain a correct linear guidance it is important that the axes of the rollers are parallel. This measure simplifies alignment of the rollers in the case that the relevant traction member is formed by a band.

An embodiment of the linear guide arrangement in accordance with the invention is characterized in that the rollers bear on one of the guide surfaces via the band. This measure ensures that the roller rolls over a band and not over the guide surfaces themselves. As a result, less stringent requirements have to be imposed on the surface roughness of the guide surfaces. The surface roughness of the band then plays an important role but this surface roughness is always very low when, for example, steel band is used.

An embodiment of the linear guide arrangement in accordance with the invention is characterized in that the linear guide arrangement comprises urging means for urging the first guide surface towards the second guide surface. This measure ensures that the rollers bear on both guide surfaces, as a result of which the distance between the first and the second guide surface is constant. For example, in the case of uses where the weight of a load to be guided already produces a force which urges the first guide surface towards the second guide surface, separate urging means in the linear guide arrangement itself are not needed.

An embodiment of the linear guide arrangement in accordance with the invention is characterized in that the urging means comprise magnetic means. Magnetic means simply enable a force to be exerted on a movable body without this giving rise to forces in the direction of movement of this body. This makes it possible to avoid a preferential position of the linear guide arrangement. Such a preferential position is undesirable, for example, in the case that a linear motor is used for positioning the load to be guided because the linear motor then would to be energized continually to keep the load out of the preferential position, as a result of which energy is lost.

The device in accordance with the invention is characterized in that the linear guide arrangement is constructed as a linear guide arrangement in accordance with the invention, the first body being connected to the frame and the second body being connected to the head. It has been found that this measure has no adverse effect on the dynamic behaviour of the head. The dynamic behaviour of a head is often symbolized by a curve representing the displacement of the head as a function of the frequency with which the head is driven. For the device in accordance with the invention this curve is smooth up to 100 to 200 Hz. In addition, the device in accordance with the invention has the advantage that the linear guide arrangement can readily be integrated with the head and the frame. As a result, the number of parts and the number of connections is reduced and only a small volume is required for the linear guide arrangement.

It is to be noted that EP 70070 (PHN 10095) describes an apparatus comprising an optical head for reading an optical disc. The head is movable relative to a frame along a straight line and is supported by means of eight rollers which are rotatably connected to the head by means of a ball-bearing and which bear on four guide surfaces connected to the frame. A disadvantage of the known apparatus is that the bearing arrangement of the head comprises many parts and requires an accurate dimensioning.

An embodiment of the device in accordance with the invention is characterized in that the device comprises a linear motor for positioning the head relative to the frame, which linear motor comprises a stator secured to the frame, and a movable member secured to the head. This embodiment has the advantage that it provides a drive without lost motion. Moreover, a linear motor enables the head to be controlled accurately also at higher frequencies and a linear motor is of simple construction.

The apparatus in accordance with the invention comprises a device in accordance with the invention, means for moving a magnetic tape past the head, and a servo circuit for converting read signals from the head into control signals for the linear motor. Owing to these measures the head can accurately follow tracks already present on the tape. This high accuracy enables narrow tracks to be positioned close to one another on the tape, so that a large amount of information can be stored on one tape. The linear guide arrangement and the device in accordance with the invention are very suitable for use in the apparatus in accordance with the invention because they require a large range of head displacements and a high accuracy of dynamic head displacements. This is rendered possible in particular by the low friction of the linear guide arrangement.

BRIEF DESCRIPTION OF THE DRAWINGS

The invention will now be described in more detail, by way of example, with reference to the drawings, in which.

DETAILED DESCRIPTION OF THE PREFERRED EMBODIMENTS OF THE INVENTION

Figure 1:
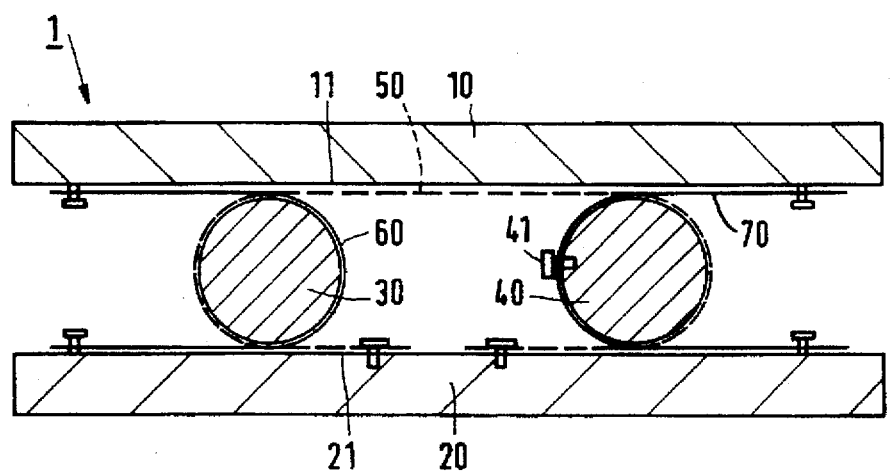
FIG. 1 is a sectional view showing a first embodiment of the linear guide arrangement in accordance with the invention.

FIG. 1 is a sectional view showing a first embodiment of the linear guide arrangement in accordance with the invention. The linear guide arrangement 1 shown comprises a first body 10 having a guide surface 11, and a second body 20 having a guide surface 21. The first guide surface 11 faces the second guide surface 21. A first roller 30 and a second roller 40, extending parallel to the first roller 30, are disposed between the guide surfaces 11 and 21. Both rollers 30 and 40 bear on the first guide surface 11 and the second guide surface 21. A traction member, in the present case a steel band 50, engages with the first roller 30 at a side remote from the second roller. The same steel band 50 engages with the second roller 40 at a side remote from the first roller 30. The steel band 50 has both ends connected to the second body 20 and dictates the maximum distance between the rollers 30 and 40. In addition, a further traction member, in the present case a steel band 60, engages with the first roller 30 at a side facing the second roller 40. A further traction member, in the present case another steel band 70, engages with the second roller 40 at a side facing the first roller 30. The steel bands 60 and 70 are both supported on the first and the second body 10 and 20 in that they have their ends secured to the first and the second body. When the steel bands 60 and 70 are secured the steel bands 50, 60 and 70 are tautened. The positions of the rollers 30 and 40 are dictated by the steel bands 50, 60 and 70 and the positions of the first body 10 and the second body 20 relative to one another. The steel bands 60 and 70 dictate the minimum distance between the rollers 30 and 40. When the first body 10 is moved relative to the second body 20 in a direction perpendicular to the axes of the rollers 30 and 40, the rollers 30 and 40 will roll over the steel bands. The rollers 30 and 40 then move over half the distance over which the first body 10 is moved. This yields an optimum bearing arrangement. Moreover, the rollers 30 and 40 are positioned in such a manner that hardly any friction occurs. In order to prevent the rollers from being displaced in their axial directions a connection may be provided between, for example, the roller 40 and the steel band 70 by means of a screw 41 or another fastening means such as a weld.

Figure 2:
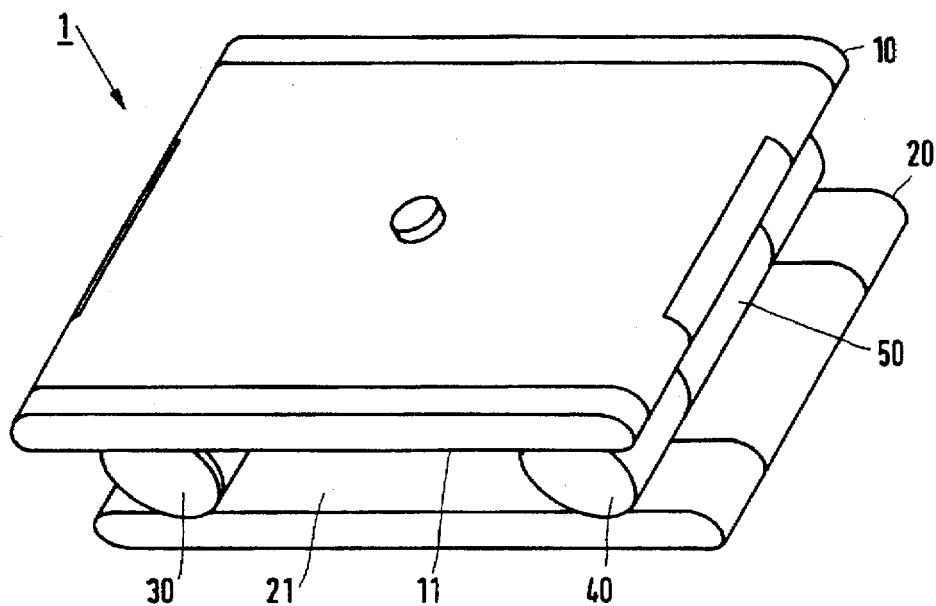
FIG. 2 is a perspective view showing a second embodiment of the linear guide arrangement in accordance with the invention.

FIG. 2 is a perspective view of a second embodiment of the linear guide arrangement in accordance with the invention. The linear guide arrangement 1 comprises a first body 10 and a second body 20. The first body 10 has first guide surface 11 and the second body 20 has a second guide surface 21. Two circularly cylindrical rollers 30 and 40 are disposed between the guide surfaces 11 and 21. An endless steel band 50 engages around both rollers 30 and 40.

Figure 3:
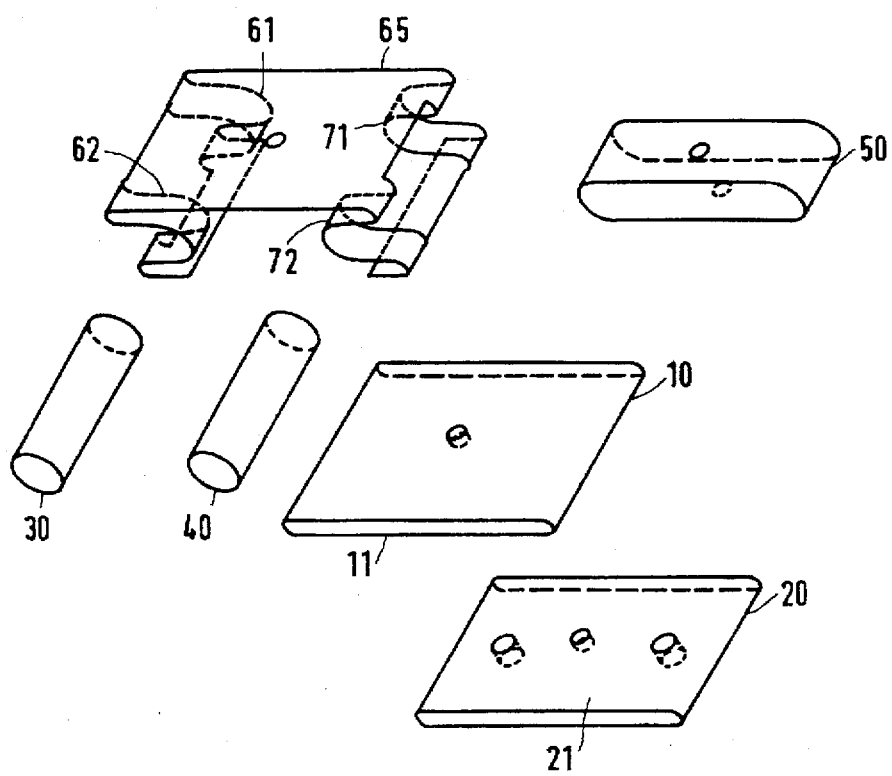
FIG. 3 is an exploded view of the second embodiment.

FIG. 3 is an exploded view of the embodiment of the linear guide arrangement 1 as shown in FIG. 2. FIG. 3 clearly shows that at least one of the traction members, in the present case the steel band 50, forms an endless loop. The further traction members 61, 62, 71, 72, which engage with the first roller 30 at the side facing the second roller 40 and with the second roller 40 at the side facing the first roller 30, are formed by a traction element 65. The traction member 65 engages around the first body 10 and is supported on the first body 10 without the need to secure the traction element 65 to the first body 10 for this purpose. The traction element 65 comprises four traction members 61, 62, 71, 72, of which two members engage with the first roller 30 and two members engage with the second roller 40. In the assembled condition of the linear guide arrangement 1 the steel band 50 is disposed between the traction members 61 and 62 near the first roller and between the traction members 71 and 72 near the second roller 40. The traction element 65 has its ends secured to the second body 20. Just before the traction element 65 is secured to the second body 20 the traction element 65 is slightly tautened to clamp the rollers 30 and 40 between the steel band 50 and the traction element 65. In the second embodiment of the linear guide arrangement in accordance with the invention as shown in FIG. 2 and FIG. 3 the rollers 30 and 40 bear on the guide surfaces 11 and 21 via the bands 50, 61, 62, 71, 72.

Figure 4:
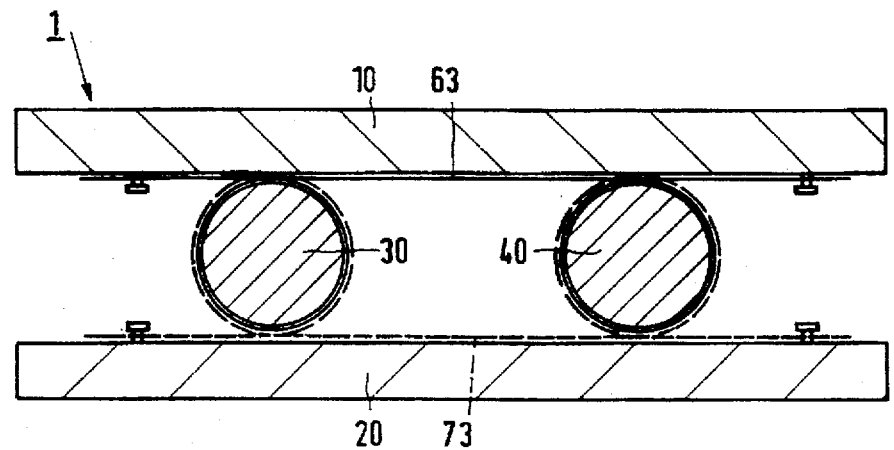
FIG. 4 is a sectional view showing a third embodiment of the linear guide arrangement in accordance with the invention.

FIG. 4 is a sectional view of a third embodiment of the linear guide arrangement in accordance with the invention. In this embodiment the rollers 30 and 40 are positioned by a traction member, in the present case a cable 63, which is secured to the first body 10 and which is wrapped wholly, i.e. through 360°, around the first roller 30 and the second roller 40. In addition, the linear guide arrangement 1 comprises a further traction member, in the present case a second cable 73, which is secured to the second body 20 and which is wrapped wholly around the first roller 30 and the second roller 40. The traction members may alternatively be formed by a band of steel or another suitable material. It is also possible to use four cables, in which case two cables are secured to the first body 10 and two cables are secured to the second body 20 in a manner as described above.

Figure 5:
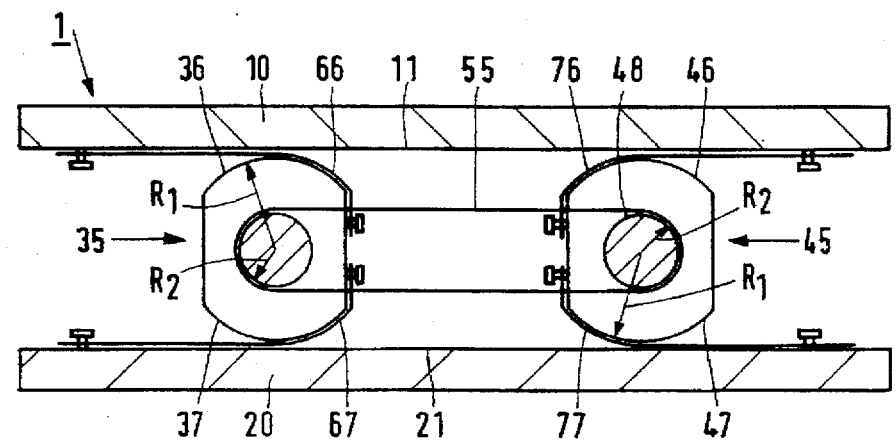
FIG. 5 is a sectional view showing a fourth embodiment of the linear guide arrangement in accordance with the invention.

FIG. 5 is a sectional view of a fourth embodiment of the linear guide arrangement in accordance with the invention. In this embodiment the first roller 35 and the second roller 45 bear on the first guide surface 11 with a first curved surface 36 and 46, respectively. Moreover, the first roller 35 and the second roller 45 bear on the second guide surface 21 with a second curved surface 37 and 47, respectively. Both curved surfaces 36, 37 and 46, 47, respectively, have the same radius $R_1$ and are concentric. A traction member 55 is wrapped around the first roller 35 at a side which is remote from the second roller 45. The same traction member 55 is wrapped around the second roller 45 at a side which is remote from the first roller 35. The traction member 55 passes over a surface 38 of the fast roller 35 and over a surface 48 of the second roller 45. The surfaces 38 and 48 are circularly cylindrical and have radius $R_2$ smaller than the radius $R_1$ of the curved surfaces 36, 37 and 46, 47, respectively. A further traction member, in the present case comprising a steel band 66 and second steel band 67, is wrapped around the first roller 35 at a side which faces the second roller 45. The steel band 66 has one end connected to the first body 10 and the other end to the first roller 35. The second steel band 67 has one end connected to the second body 20 and the other end to the roller 35. A traction member comprising a steel band 76 and a steel band 77 is wrapped around the second roller 45 at a side which faces the first roller 35, which steel bands are secured in a manner similar to the steel bands 66 and 67.

Figure 6:
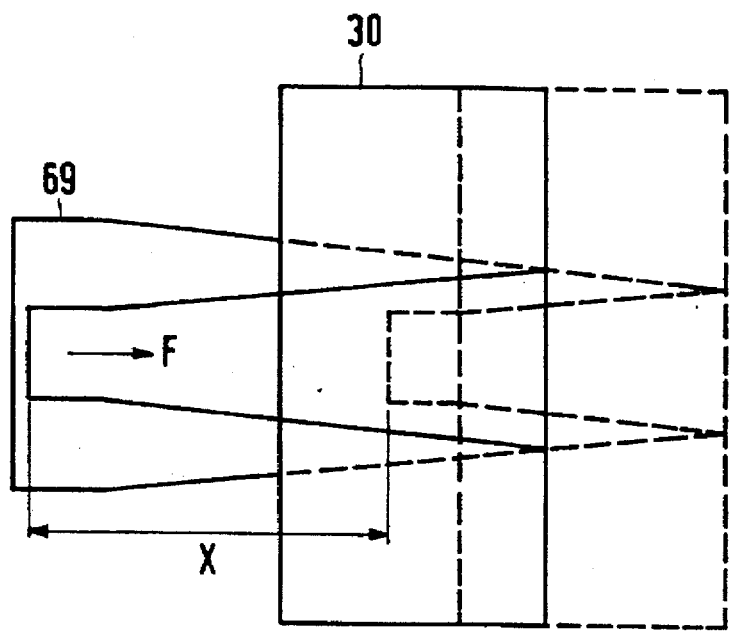
FIG. 6 is a plan view showing a roller and a band in a fifth embodiment of the linear guide arrangement in accordance with the invention.

FIG. 6 is a plan view showing a part of a fifth embodiment of the linear guide arrangement in accordance with the invention. This embodiment is characterized in that at least one of the traction members, in the present case a steel band 69, has a local resistance to bending which varies over the length of the relevant traction member. In the present case this is achieved by giving the steel band 69 a width which varies over the length of the band. Alternatively, a steel band could be used having a thickness which varies over its length or having as composition which varies over its length. The steel band 69 has a width which varies linearly in the longitudinal direction of the steel band 69.

Figure 7:
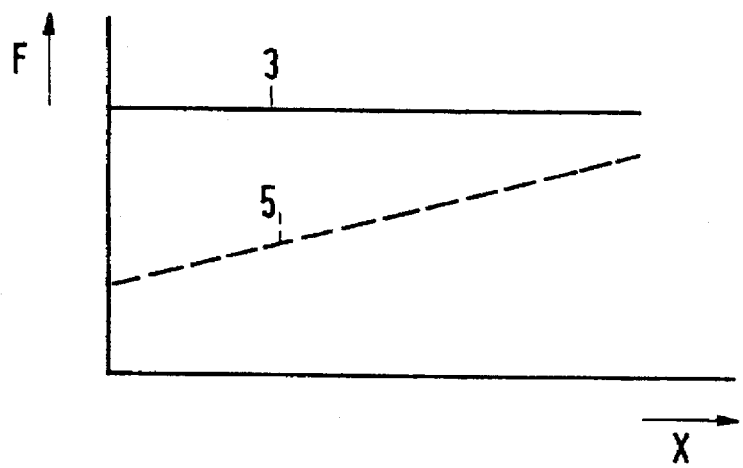
FIG. 7 is a force-displacement diagram relating to a fifth and a sixth embodiment of the invention.

If in a linear guide arrangement in accordance with the invention the steel band 69 is wrapped around the first roller 30 in FIG. 6, a force F will occur in the guiding direction of the linear guide arrangement and will act on the first body 10 (see FIG. 1). In the case of a steel band 69 whose width varies linearly in the longitudinal direction of the steel band this force will be independent of the displacement x which corresponds to the displacement of the first body 10 relative to the second body 20 (see FIG. 1). This force F as a function of the displacement x is represented by the curve 3 in the force-displacement diagram shown in FIG. 7. Another relationship between the force F and the displacement x can be obtained by giving one of the steel bands a suitable width profile, for example as shown in FIG. 1. A variation of the force F as a function of the displacement x as represented by the curve 5 in FIG. 7 can be obtained, for example, by varying the width of a blade spring quadratically in its longitudinal direction.

Figure 8:
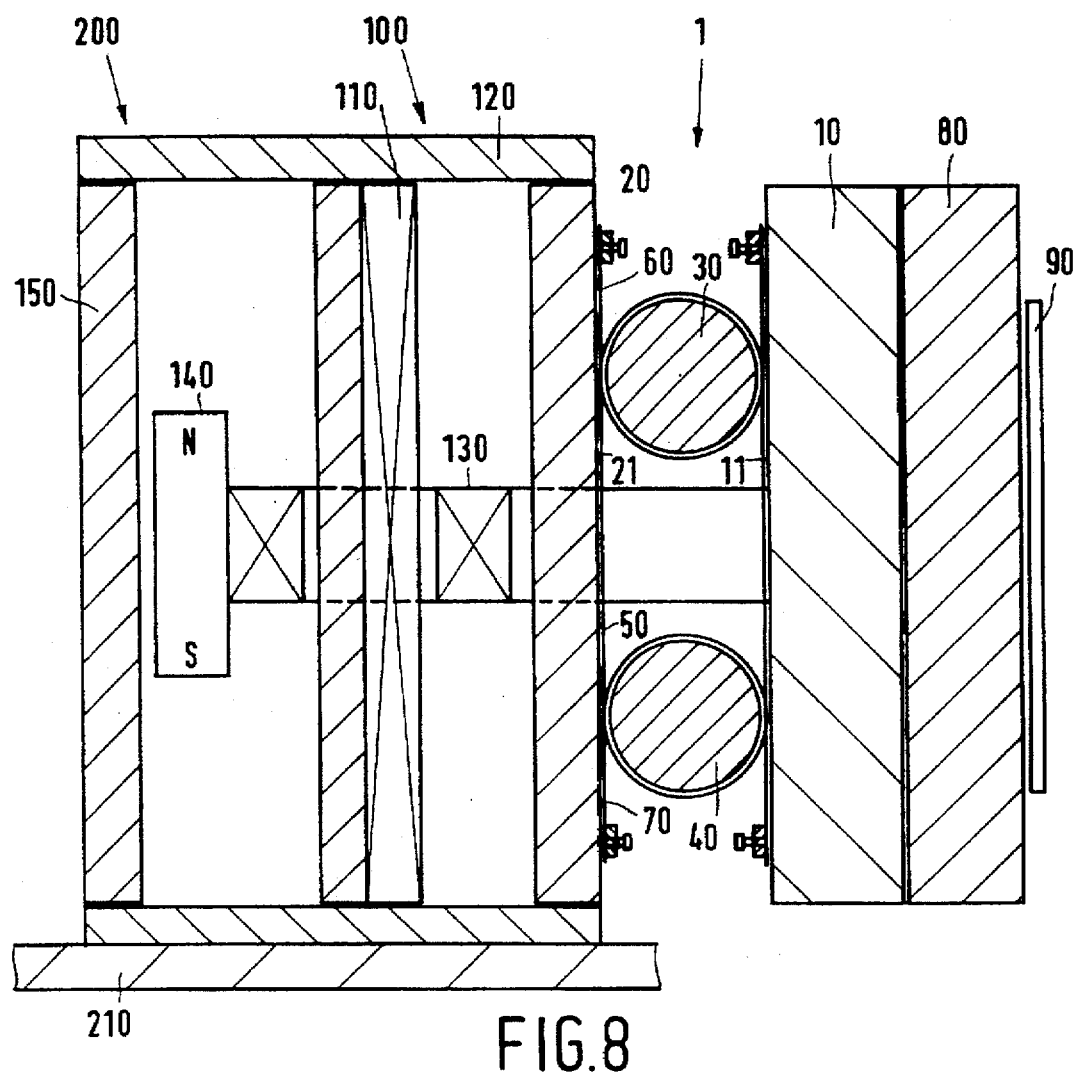
FIG. 8 is a sectional view showing a device for reproducing and/or recording information in accordance with the invention.

FIG. 8 is a sectional view of a device 200 for reproducing and/or recording information, comprising a head 80, a frame 210, and a linear guide arrangement 1 for guiding the head relative to the frame 210 along a straight line. The linear guide arrangement is of a construction as shown in FIG. 1. The head 80 serves for reading and/or writing information from/on a medium, in the present case a magnetic tape 90. The device 200 further comprises a linear motor 100, formed by a magnet 110, flux-linkage irons 120 and a movable coil 130. The movable coil 130 is connected to the first body 10 of the linear guide arrangement 1, which body carries the head 80. The second body 20 of the linear guide arrangement 1 forms part of the magnet system of the linear motor 100. This enables a very compact device 200 to be realized. The linear guide arrangement 1 has urging means, in the present case magnetic urging means in the form of a magnet 140 and a soft-iron member 150, for urging the first guide surface 11 towards the second guide surface 21. This guarantees that there is always proper contact between the first roller 30 and the second roller 40 and the guide surfaces 11 and 21 via the steel bands 50, 60 and 70.

Figure 9:
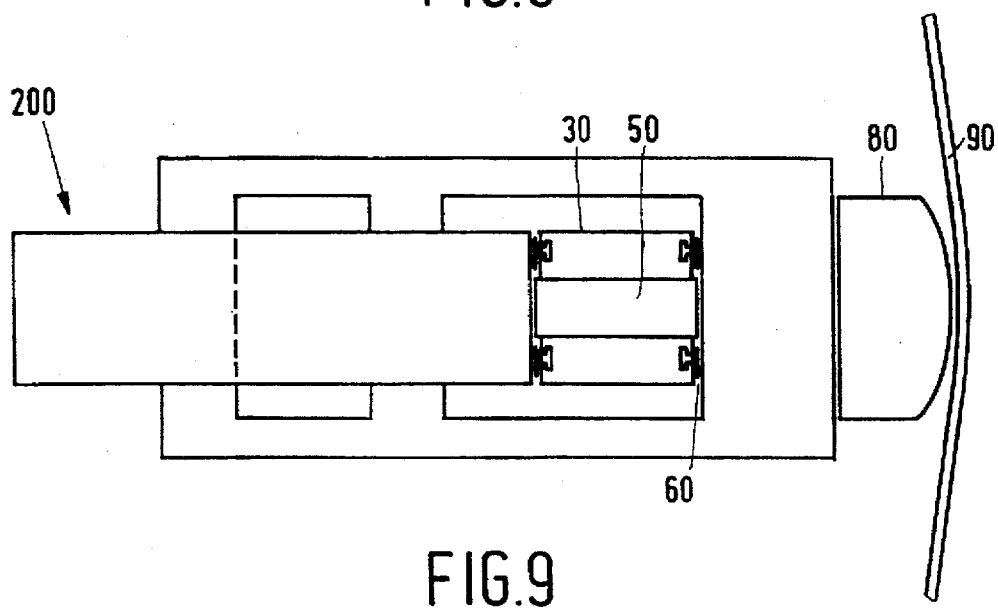
FIG. 9 is a plan view of the device shown in FIG. 8.

FIG. 9 is a plan view of the device 200 as shown in FIG. 8. The reference numerals in FIG. 9 relate to the elements as described with reference to FIG. 8.

Figure 10:
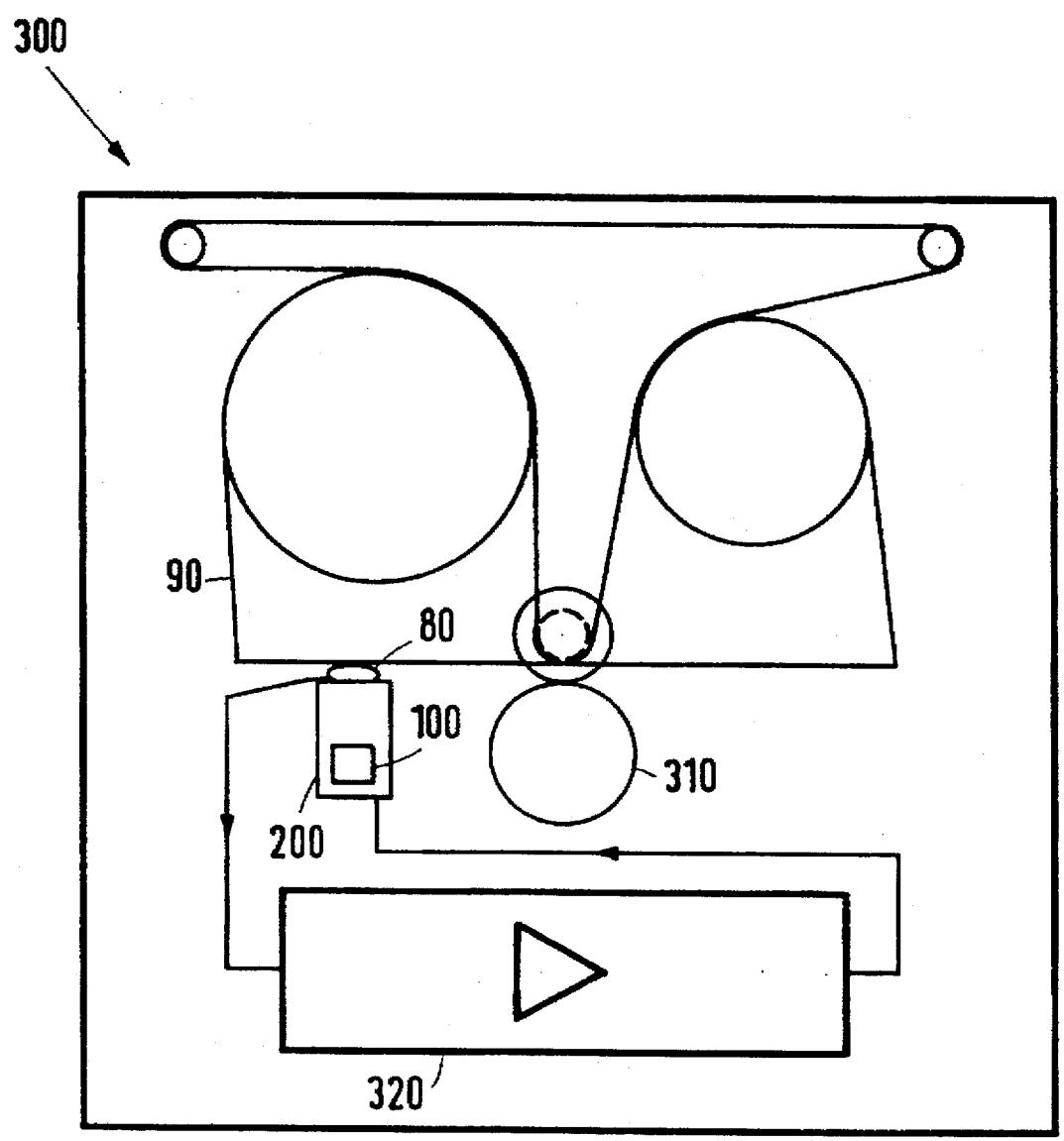
FIG. 10 is a diagrammatic view of the apparatus in accordance with the invention.

FIG. 10 shows diagrammatically an apparatus 300 for recording and/or reproducing information. The apparatus 300 further comprises a device 200 as shown in FIG. 8 and FIG. 9, means for moving a magnetic tape 90 past the head 80 of the device 200, and a servo circuit 320. The servo circuit 320 converts read signals from the head into control signals for the linear motor 100 in the device 200. These measures enable tracks recorded on the magnetic tape 90 to be followed actively.

It is to be noted that the invention is not limited to the embodiments shown herein. Within the scope of the invention various other embodiments are possible. The linear guide arrangement can be used, for example, in positioning systems for machining tools or measuring instruments. Moreover, the linear guide arrangement in accordance with the invention may comprise more than two rollers.

We claim:

1. A linear guide arrangement comprising
   a first body to be mounted to a frame of a recording and/or reproducing device and having a first guide surface,
   a second body to be mounted to a recording and/or reproducing head and having a second guide surface, the second body facing the first guide surface with its second guide surface,
   a first roller and a second roller arranged parallel to the first roller, which rollers both bear on the first guide surface and the second guide surface, and
   a traction member engaging with the first roller at a side remote from the second roller and engaging with the second roller at a side remote from the first roller,
   characterized in that
   at least one further traction member which bears on at least one of the bodies, engages with the first roller at a side facing the second roller and engages with the second roller at a side facing the first roller.

2. A linear guide arrangement as claimed in claim 1, characterized in that the first and the second roller bear on the first guide surface with a first curved surface and bear on the second guide surface with a second curved surface, and both curved surfaces of each roller have the same radius and are concentric.

3. A linear guide arrangement as claimed in claim 2, characterized in that at least one of the traction members forms an endless loop.

4. A linear guide arrangement as claimed in claim 2, characterized in that the traction members comprise a band.

5. A linear guide arrangement as claimed in claim 2, characterized in that at least one of the traction members has a local resistance to bending which varies over the length of the relevant traction member.

6. A linear guide arrangement as claimed in claim 5, characterized in that the traction member has a width which varies over its length.

7. A linear guide arrangement as claimed in claim 6, characterized in that the at least one further traction member forms part of a single traction element.

8. A device for recording and/or reading information, comprising a head for reading and/or writing information from/on a medium, a frame, and a linear guide arrangement for guiding the head relative to the frame along a straight line, the linear guide arrangement being constructed as a linear guide arrangement as claimed in claim 7, the first body being connected to the frame and the second body being connected to the head.

9. A linear guide arrangement as claimed in claim 2, characterized in that the first roller and the second roller are constructed as circular cylinders.

10. A linear guide arrangement as claimed in claim 1, characterized in that at least one of the traction members forms an endless loop.

11. A linear guide arrangement as claimed in claim 1, characterized in that the traction members comprise a band.

12. A linear guide arrangement as claimed in claim 11, characterized in that the traction member has a width which varies over its length.

13. A linear guide arrangement as claimed in claim 11, characterized in that the rollers bear on one of the guide surfaces via the band.

14. A linear guide arrangement as claimed in claim 1, characterized in that at least one of the traction members has a local resistance to bending which varies over the length of the relevant traction member.

15. A linear guide arrangement as claimed in claim 1 characterized in that the at least one further traction member forms part of a single traction element.

16. A linear guide arrangement as claimed in claim 1, characterized in that the linear guide arrangement comprises urging means for urging the first guide surface towards the second guide surface.

17. A linear guide arrangement as claimed in claim 16, characterized in that the urging means comprise magnetic means.

18. A device (200) for recording and/or reading information, comprising a head for reading and/or writing information from/on a medium, a frame, and a linear guide arrangement for guiding the head relative to the frame along a straight line, the linear guide arrangement being constructed as a linear guide arrangement as claimed in claim 1, the first body being connected to the frame and the second body being connected to the head.

19. A device as claimed in claim 18, characterized in that the device comprises a linear motor for positioning the head relative to the frame, which linear motor comprises a stator secured to the frame, and a movable member secured to the head.

20. An apparatus for recording and/or reproducing information, comprising a device as claimed in claim 19, means for moving a magnetic tape past the head, and a servo circuit for converting read signals from the head into control signals for the linear motor.

* * * * *